US012325619B2

(12) United States Patent
Lalier et al.

(10) Patent No.: US 12,325,619 B2
(45) Date of Patent: Jun. 10, 2025

(54) ADAPTER

(71) Applicant: Conopco, Inc., Englewood Cliffs, NJ (US)

(72) Inventors: Gregory Lalier, Brookfield, CT (US); Slavica Cesare, Trumbull, CT (US)

(73) Assignee: Conopco, Inc., Hoboken, NJ (US)

( * ) Notice: Subject to any disclaimer, the term of this patent is extended or adjusted under 35 U.S.C. 154(b) by 0 days.

(21) Appl. No.: 18/019,217

(22) PCT Filed: Jul. 14, 2021

(86) PCT No.: PCT/EP2021/069616
§ 371 (c)(1),
(2) Date: Feb. 1, 2023

(87) PCT Pub. No.: WO2022/028832
PCT Pub. Date: Feb. 10, 2022

(65) Prior Publication Data

US 2023/0278852 A1 Sep. 7, 2023

Related U.S. Application Data

(60) Provisional application No. 63/060,350, filed on Aug. 3, 2020.

(30) Foreign Application Priority Data

Oct. 23, 2020 (EP) .................................... 20203694

(51) Int. Cl.
*B67D 7/02* (2010.01)

(52) U.S. Cl.
CPC .................................. *B67D 7/0288* (2013.01)

(58) Field of Classification Search
CPC ............................ B67D 7/0288; B65D 71/502
See application file for complete search history.

(56) References Cited

U.S. PATENT DOCUMENTS

| | | | |
|---|---|---|---|
| 2,773,521 | A | 12/1956 | Persson |
| 3,156,272 | A | 11/1964 | Indrunas |
| 3,945,617 | A | 3/1976 | Callery |
| 4,347,879 | A | 9/1982 | Blaser |
| 4,456,137 | A | 6/1984 | Lyman |

(Continued)

FOREIGN PATENT DOCUMENTS

| | | |
|---|---|---|
| CA | 2098544 | 12/1994 |
| CA | 2442689 | 10/2002 |

(Continued)

OTHER PUBLICATIONS

Co-pending U.S. Appl. No. 18/019,225, filed Feb. 1, 2023, entitled Closure.

(Continued)

*Primary Examiner* — Jason K Niesz
(74) *Attorney, Agent, or Firm* — Gerard J. McGowan, Jr.

(57) ABSTRACT

An adapter which is readily applied to connect a dispensing container to a refill container. The adapter and one or more of the containers are structured so that the adapter can be readily and securely snapped onto the container and then easily rotated off without application of undue force by a consumer. The adapter features a snap on pipe having one or more retaining recesses and guidance recesses.

15 Claims, 7 Drawing Sheets

(56) References Cited

U.S. PATENT DOCUMENTS

| | | | | |
|---|---|---|---|---|
| 4,991,733 | A | 2/1991 | Marino | |
| 5,145,080 | A | 9/1992 | Imbery, Jr. | |
| 5,642,763 | A * | 7/1997 | Kurtz | B65D 71/502<br>141/319 |
| 5,690,242 | A | 11/1997 | Campbell, Jr. | |
| 5,884,678 | A | 3/1999 | Chudy | |
| 5,938,082 | A | 8/1999 | Foster et al. | |
| 5,992,656 | A | 11/1999 | Dujardin et al. | |
| 6,155,462 | A | 12/2000 | Brecheisen et al. | |
| 6,237,649 | B1 | 5/2001 | Moisio et al. | |
| 6,659,145 | B1 | 12/2003 | Reif et al. | |
| 7,128,227 | B2 | 10/2006 | Skillin et al. | |
| D546,693 | S | 7/2007 | Okin et al. | |
| D542,141 | S | 8/2007 | Okin et al. | |
| 7,510,095 | B2 | 3/2009 | Comeau et al. | |
| 7,621,413 | B2 | 11/2009 | Miota et al. | |
| 7,735,665 | B2 | 6/2010 | Robinson | |
| 8,365,933 | B2 | 5/2013 | Jackel | |
| 8,673,242 | B2 | 3/2014 | Shick | |
| 8,794,474 | B2 | 8/2014 | Mueller et al. | |
| 9,145,245 | B1 * | 9/2015 | Visser | F16L 15/06 |
| 9,850,040 | B2 | 12/2017 | Scott et al. | |
| 10,029,903 | B1 | 7/2018 | White | |
| 10,507,957 | B2 | 12/2019 | Toh et al. | |
| 10,722,911 | B2 | 7/2020 | Surin et al. | |
| 10,750,669 | B2 | 8/2020 | Roussel et al. | |
| 11,312,543 | B2 | 4/2022 | Cesare | |
| 11,702,251 | B2 | 7/2023 | Cesare et al. | |
| 11,794,956 | B2 | 10/2023 | Cesare et al. | |
| 2002/0020637 | A1 | 2/2002 | De Laforcade | |
| 2004/0245204 | A1 | 12/2004 | Suffa | |
| 2005/0056613 | A1 | 3/2005 | King | |
| 2005/0205151 | A1 | 9/2005 | Behar | |
| 2007/0289670 | A1 | 12/2007 | Johns et al. | |
| 2008/0128418 | A1 | 6/2008 | Ahn | |
| 2009/0152303 | A1 | 6/2009 | Behar | |
| 2009/0242564 | A1 | 10/2009 | Danks | |
| 2010/0288787 | A1 | 11/2010 | Jackel | |
| 2012/0318825 | A1 | 12/2012 | Beranger et al. | |
| 2013/0146174 | A1 | 6/2013 | Zinn et al. | |
| 2013/0270266 | A1 | 10/2013 | Lee | |
| 2014/0069552 | A1 | 3/2014 | Liu et al. | |
| 2014/0251938 | A1 | 9/2014 | Rose | |
| 2014/0291277 | A1 | 10/2014 | Perez | |
| 2014/0345744 | A1 | 11/2014 | Wulstein | |
| 2015/0266630 | A1 | 9/2015 | Scott et al. | |
| 2016/0152385 | A1 | 6/2016 | Wohlgenannt | |
| 2017/0297780 | A1 | 10/2017 | Cesare et al. | |
| 2018/0237286 | A1 * | 8/2018 | Seiba | B65D 35/26 |
| 2020/0189809 | A1 | 6/2020 | Moskovich | |

FOREIGN PATENT DOCUMENTS

| | | |
|---|---|---|
| CN | 1509246 | 6/2004 |
| CN | 2734649 | 10/2005 |
| CN | 1697757 | 11/2005 |
| CN | 201400373 | 2/2010 |
| CN | 203318920 | 12/2013 |
| CN | 104925334 | 9/2015 |
| CN | 108473237 | 8/2018 |
| CN | 110709331 | 1/2020 |
| DE | 8702986 | 5/1987 |
| DE | 20308059 | 9/2003 |
| EA | 201891037 | 1/2019 |
| EP | 0104501 | 4/1984 |
| EP | 0179706 | 2/1988 |
| EP | 2921232 | 9/2015 |
| GB | 739485 | 11/1995 |
| GB | 2342347 | 4/2000 |
| JP | 5681049 | 7/1981 |
| JP | S5943348 | 3/1984 |
| JP | 2004136976 | 5/2004 |
| JP | 2005200026 | 7/2005 |
| JP | 2011136745 | 7/2011 |
| JP | 6891175 | 5/2021 |
| KR | 20110067284 | 6/2011 |
| WO | WO9321103 | 10/1993 |
| WO | WO02081316 | 10/2002 |
| WO | WO2012092989 | 7/2012 |
| WO | WO2017108697 | 6/2017 |
| WO | WO2018114301 | 6/2018 |
| WO | WO2018220013 | 12/2018 |

OTHER PUBLICATIONS

Co-pending U.S. Appl. No. 16/065,173, filed Jun. 22, 2018, entitled Closure.
Co-pending U.S. Appl. No. 17/726,393, filed Apr. 21, 2022, entitled Closure.
Co-pending U.S. Appl. No. 15/611,781, filed Jun. 1, 2017, entitled Closure.
Co-pending U.S. Appl. No. 16/983,376, filed Aug. 29, 2020, entitled Closure.
Search Report and Written Opinion in PCTEP2018064188.
Search Report and Written Opinion in EP15202602; Jun. 2, 2016.
Search Report and Written Opinion in PCTEP2016081755; Feb. 2, 2017.
IPRP2 in PCTEP2016081755; Nov. 9, 2017.
Search report and Written Opinion in EP20203694; May 11, 2021.
Search Report and Written Opinion in PCTEP2021069616; Nov. 3, 2021.
Search Report and Written Opinion in PCTEP2021071341; Nov. 15, 2021.

* cited by examiner

ADAPTER

BACKGROUND OF THE INVENTION

Much concern has been expressed recently concerning the amount of solid plastic waste which is deposited in our oceans and landfills. While plastics have many desirable properties for consumer products, it would be beneficial to make better use of our plastic containers, such as by re-using them. One way in which re-use of containers could be encouraged would be to provide refills for replenishing their contents upon emptying, instead of discarding them.

While consumers are interested in minimizing discarded plastics, there are obvious competing interests such as convenience and ease of use. For example, a successful refill idea would likely need to provide a means for refilling a container that would not require considerable effort, and its mode of operation would preferably be apparent to consumers.

Various refills have been proposed. These include those disclosed in Mueller et al. U.S. Pat. No. 8,794,474, Johns et al. US Patent Application Publication No. US 2007/0289670 and Cesare et al. WO 2018/114301.

One approach to refills would be to use a coupling device to permit ready transfer of contents from the refill to the primary package. Coupling devices and the like are known in the art for various purposes. Some of these devices are found in US Patent Application Publication No. 2018/237286A, U.S. Pat. No. 10,029,903B, Wuhlstein US Patent Application Publication No. 2014/345744A, Perez US Patent Application Publication No. 2014/291277A, Liu et al. US Patent Application Publication No. 2014/069552A, Lee Patent Application Publication No. US2013/270266A, Zinn et al. US Patent Application Publication No. 2013/146174A, Cheol KR20110067284A, Behar US Patent Publication No. 2005/205151A, Klein DE20308059U1, U.S. Pat. No. 6,659,145B, US2002020637A, GB2342347A, U.S. Pat. Nos. 6,237,649B, 5,884,678A, WO9321103A1, U.S. Pat. Nos. 4,347,879A, 3,945,617A, 3,156,272A, and 2,773,521A.

Important features of closures and refills are the ways in which they are applied to the container and the manner in which they are opened by the consumer. Ideally, application of the closure during manufacture should be quick and sure. The manner of opening and re-closing of the closure by the consumer should be convenient and readily apparent.

Jackel U.S. Pat. No. 8,365,933 discloses a dispensing closure which is a snap-on closure which can be separated from the container via a rotational motion. The closure includes a cylindrical snap on pipe. The snap-on closure can be pressed upon a spout wherein two interacting elements are shifted by or over one another due to their flexibility. The container has a forcing device which is designed to engage at least one recess on the snap on pipe to force the dispensing closure to move in an axial direction when turning the closure and so that at least one threaded segment of the snap on pipe is pressed over at least one threaded segment of the dispensing element thereby releasing the dispensing closure from the spout.

Cesare et al. WO 2018/220013 discloses a snap-on/twist off closure featuring a cylindrical snap on pipe including threads designed to mate with external threads on a neck of the bottle. The pipe includes a resistance recess and a guidance recess. The resistance recess and the guidance recess accommodate a forcing element on a shoulder of the bottle and permit unscrewing of the closure. The cylindrical snap-on pipe thread may pass axially over the bottle thread whereby removal of the closure is facilitated. Removal is also facilitated by interruptions in the external neck thread and/or the internal snap-on pipe thread and the flexible material of which the closure is made.

Dujardia et al. U.S. Pat. No. 5,992,656 is directed to a plastic closure having recesses for engaging with projections at the base of the container neck for producing locking and snap-type connections.

Imbery et al. U.S. Pat. No. 5,145,080 discloses a container neck protuberance received in a closure recess to prevent relative rotation of the closure and container.

CA 2098 544 A1 relates to a connector for connecting two containers together so that the contents may be poured from one to another without spillage.

SUMMARY OF THE INVENTION

The present invention is directed to an apparatus for promoting the refilling of containers. The apparatus comprises an adapter which is readily applied to connect a dispensing container to a refill container. The adapter and one or more of the containers are structured so that the adapter can be readily and securely snapped onto the container and then easily rotated off without application of undue force by a consumer.

The adapter comprises two chambers with openings, one for applying the adapter to the dispensing container, and the other for applying the adapter to the refill. The adapter, therefore, serves to connect the dispensing container and the refill and permit transfer of the contents from the refill to the dispensing container. Transfer can be directly from one adapter chamber to the other or there may be a passageway connecting them.

The snap on/twist off function is facilitated by the presence of a cylindrical snap on pipe open at one end which defines a first adapter chamber. An opposed second adapter opening may be defined by a wall forming a second adapter chamber having a second adapter opening and which screws onto or into the refill container in a conventional manner. The connection between the second adapter chamber and the container may also be a conventional snap fit arrangement. Alternatively, the connection between the refill and the dispensing package may also be snap on/rotate off. Or the connection between the dispensing container and the adapter may be conventional and the connection between the adapter and the refill may be snap-on/rotate off.

A wide variety of arrangements are possible for the adapter. These include: a snap on twist off connection between one end of the adapter and a dispensing container and a conventional threaded or snap fit connection between the other end of the adapter with a refill, a snap on twist off connection between one end of the adapter with a refill container and a conventional threaded or snap fit connection between the other end of the adapter with a dispensing container, or snap on twist off connections on both ends of the adapter, one with a dispensing container and the other with a refill, or a conventional threaded or snap fit connection with a dispensing container at one end of the adapter and a conventional threaded or snap fit connection with a refill at the other end of the adapter.

The cylindrical snap on pipe has a first fastener protuberance, which may be an internal snap bead, for fastening the first adapter opening to a first container. Preferably the first container is the dispensing container but it may be the refill container or, again, both refill and dispensing containers may have snap on/rotate off connections.

The cylindrical snap-on pipe has a first, proximal, end adjacent the passageway or the second chamber, and an opposed second, distal, end at its opening. The cylindrical snap-on pipe includes at least one retaining or resistance recess at its second end, the cylindrical snap-on pipe defining opposing first and second walls of the retaining recess. The retaining recess receives a lug, preferably on the container neck, when the adapter is snapped on to the container in the closed position. That helps orient the adapter in the correct, closed position.

In one embodiment the first and second walls of the retaining recess have different gradients so that one may be steeper than the other, the steeper wall preventing rotation beyond a pre-determined point in the non-opening direction. In another embodiment, the gradients of the first and second retaining recess walls are essentially the same at each point lying at the same axial vertical height. Use of symmetric first and second resistance walls is advantageous in that they are more easily manufactured than walls having varying angles.

The second, distal end of the cylindrical snap-on pipe also includes an additional recess, a guidance recess. The guidance recess includes a first guidance recess wall having an upward gradient consistent with lowering the cylindrical snap-on pipe thread relative to a container when the container is oriented so that the adapter is on top of the container. The guidance recess also includes a second guidance recess wall, which wall includes a downward gradient in the opening direction.

In an adapter opening direction of rotation, the first guidance recess wall permits the cylindrical snap-on pipe axially to be lowered toward the container and the second wall permits the cylindrical snap-on pipe to be raised relative to the container. The lowering and raising of the snap-on pipe may occur with the lug on the container neck contacting the first and second guidance recess walls, but preferably the lug does not contact the first and second guidance recess walls and is received at least partly within the guidance recess. The forcing element does not need to touch the guidance recess walls; the guidance recess provides space for moment of the forcing element as the closure rotates consistent with the angle of the bottle neck and snap-on pipe threads.

When the snap on pipe is snapped onto the container from above, the protuberance, e.g., thread, on the snap on pipe passes over the protuberance, e.g., thread, on the container so that the protuberance of the container is above the snap on pipe protuberance. Thus the container protuberance above the snap on pipe retains the adapter on the container. The flexibility of the material of which the closure is made and the presence of the recesses help make the snap-on pipe flexible enough such that the container thread can pass over the snap-on pipe thread.

The second guidance recess wall is at an angle to permit the protuberances on the container neck and the snap on pipe to slide past each other, i.e., to unscrew. The protuberance(s) of the snap on pipe maintains its axial position relative to a protuberance(s) on the container to which the adapter is being applied throughout much of the opening operation until approximately the end of the second guidance recess wall is reached. The bottle protuberance retains the adapter on the bottle until the adapter is rotated to a position wherein there is an interruption in one or more of the protuberances, e.g., no container protuberance above the adapter protuberance, whereby the adapter is released from the container. So, the walls of the guidance recess ensure that the protuberance of the container stays in position to retain the adapter on the container until the adapter is rotated to a position where one or both of the protuberances are interrupted and so at that point are not to be in a position to impede removal of the adapter from the container.

In the embodiment wherein only one side of the adapter is structured to snap on/rotate off, on the other side of the adapter the inside of the second adapter wall has a second fastener protuberance for fastening the second adapter wall to a second container, which may be the same or different size as the first container. Preferably the protuberances on the second wall and the second container are conventional bottle neck threads. Alternatively, the second wall can connect with the second container using conventional snap-in technology.

As indicated above, at least one of the containers includes a lug, preferably disposed on its shoulder, which is accommodated within the retaining recess when the adapter is situated on the container in the snapped on/closed position. The lug may also serve to contact a rim of the snap on pipe as the adapter is rotated open and then to encounter the first and second guidance recess walls to help lower and then raise the adapter relative to the container neck to ensure that the mating protuberances on the container and the snap on pipe remain in alignment, with the bottle protuberance above the snap-on pipe protuberance until a point is reached where one or more of the protuberances is interrupted, e.g., the container protuberance is interrupted, whereby the adapter is released from the container.

For a more complete understanding of the above and other features and advantages of the invention, reference should be made to the following detailed description of preferred embodiments and to the accompanying drawings.

DETAILED DESCRIPTION OF THE INVENTION

Figure 1:
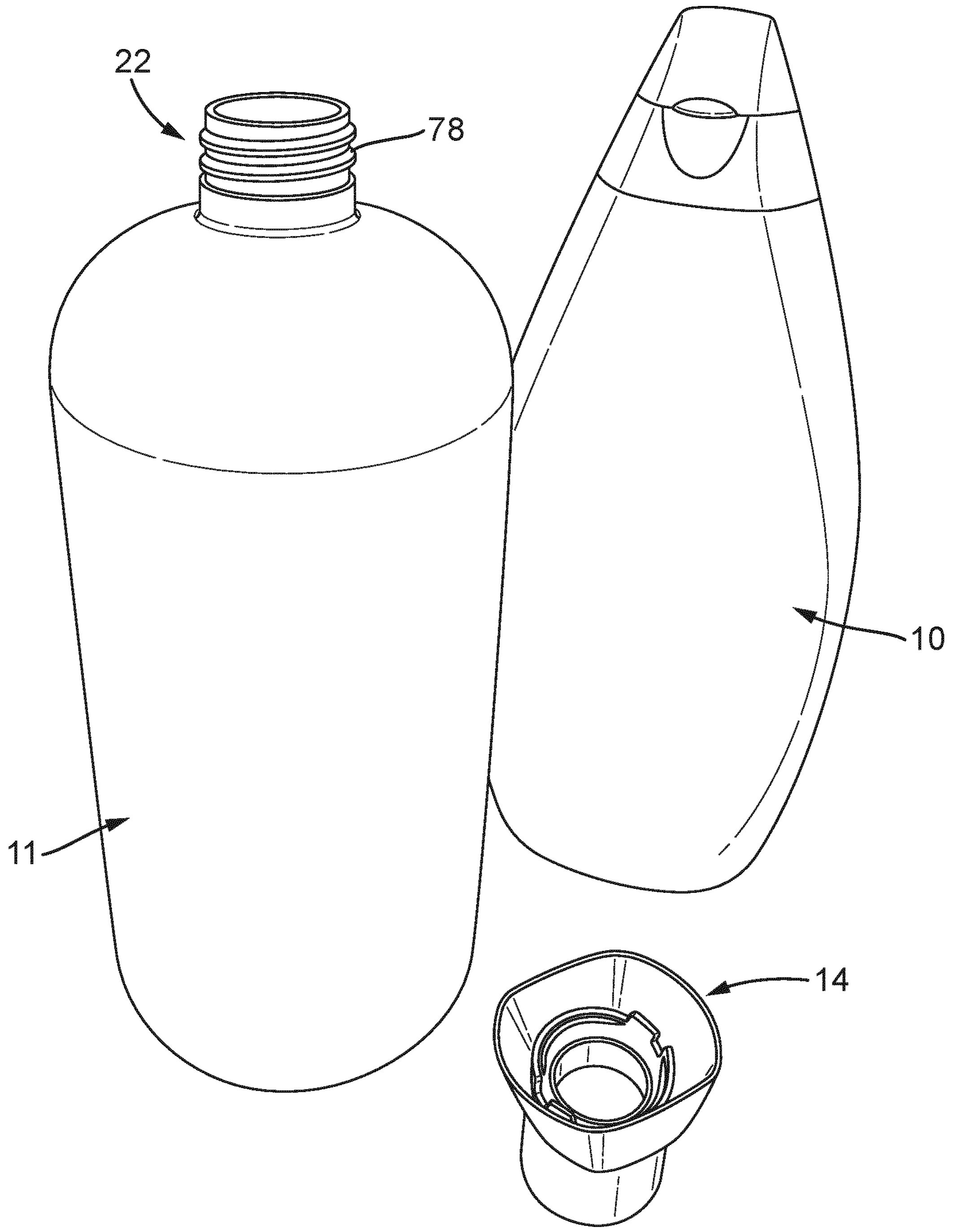
FIG. 1 is a perspective view of a dispensing bottle, a refill and an adapter according to the invention.

As seen in FIG. 1, the adapter 14 of the invention may be used with a dispensing bottle 10 (see also FIG. 6) and a refill bottle 11. The dispensing or primary bottle may be sturdier than the refill bottle and intended for multiple uses by the consumer. Reusability of the dispensing bottle will save plastic and plastic waste. The refill bottle may be thinner and made of less plastic than the primary bottle and so suitable for one or a few uses. Alternatively, the refill bottle may be made of more robust materials and may be used multiple times.

Figure 2:
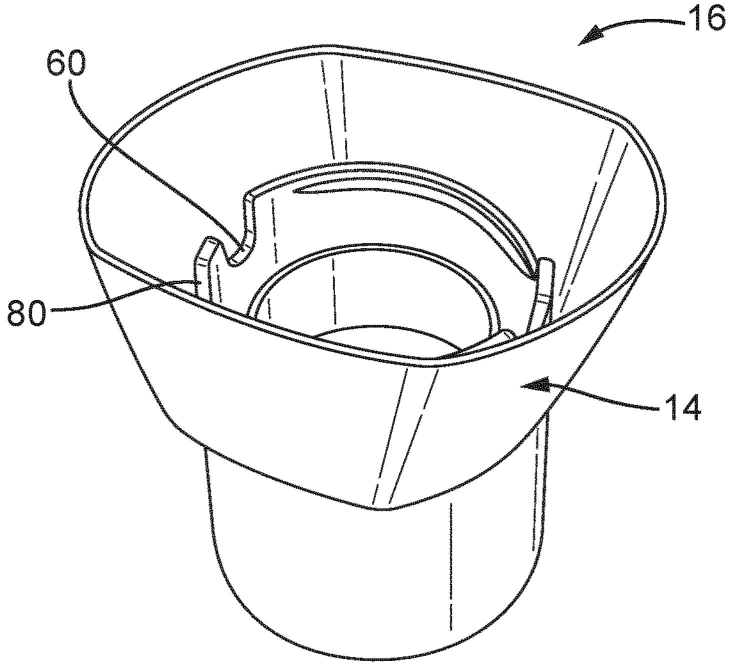
FIG. 2 is a perspective view from above and one side of the snap-on, screw off side of the adapter of the invention.
Figure 6:
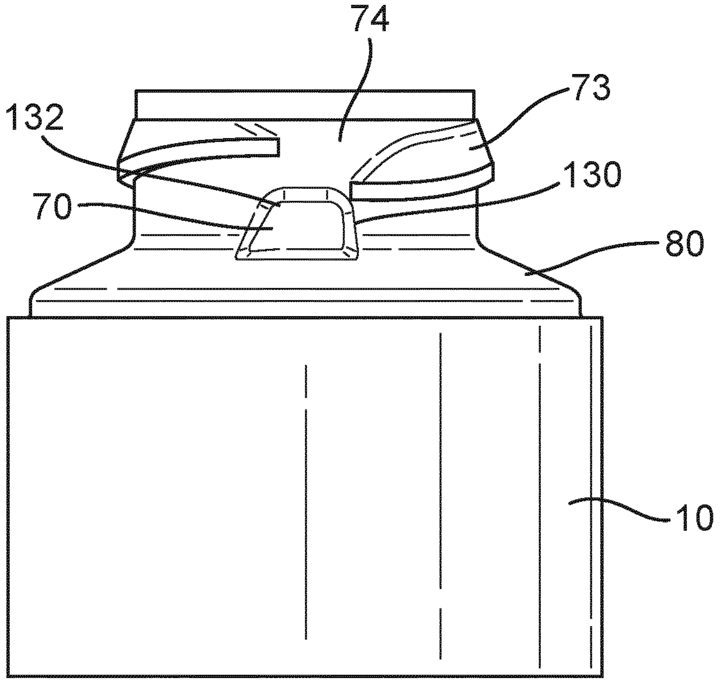
FIG. 6 is a front elevational view of the dispensing bottle with the adapter removed.

Transfer cap or adapter 14 (FIG. 2) will generally comprise two sides, preferably at least one side will be a snap-on, screw off side 16 intended for mating with an opening of e.g., the dispensing bottle 10. A second side 18 (FIG. 4) may have one or more elongated protuberances which are preferably standard screw threads 20, intended for mating with complementary protuberances, which are preferably threads 78 on neck 22 of refill bottle 11 (FIGS. 1 and 6). Alternatively, side 18 may also include the snap on screw off features of side 16 or conventional snap in technology.

Figure 3:
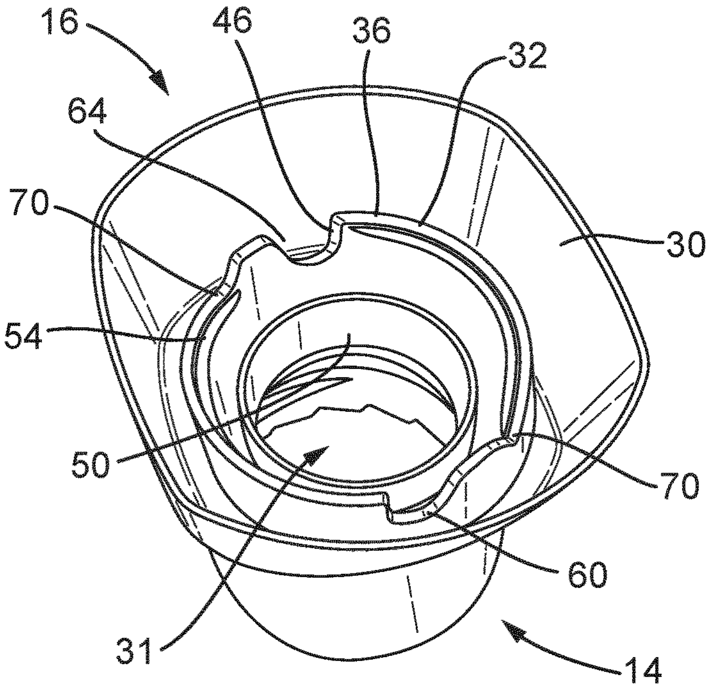
FIG. 3 is a further perspective view from above and from another angle of the snap-on, screw off side of the adapter of the invention.

As best seen in FIG. 3, snap-on, screw off side 16 of adapter 14 includes outer wall and cylindrical snap-on pipe 32 interiorly and generally parallel thereto. A rim 36 on snap on pipe 32 defines a first adapter opening and interiorly the snap on pipe defines a first adapter chamber 31.

Figure 4:
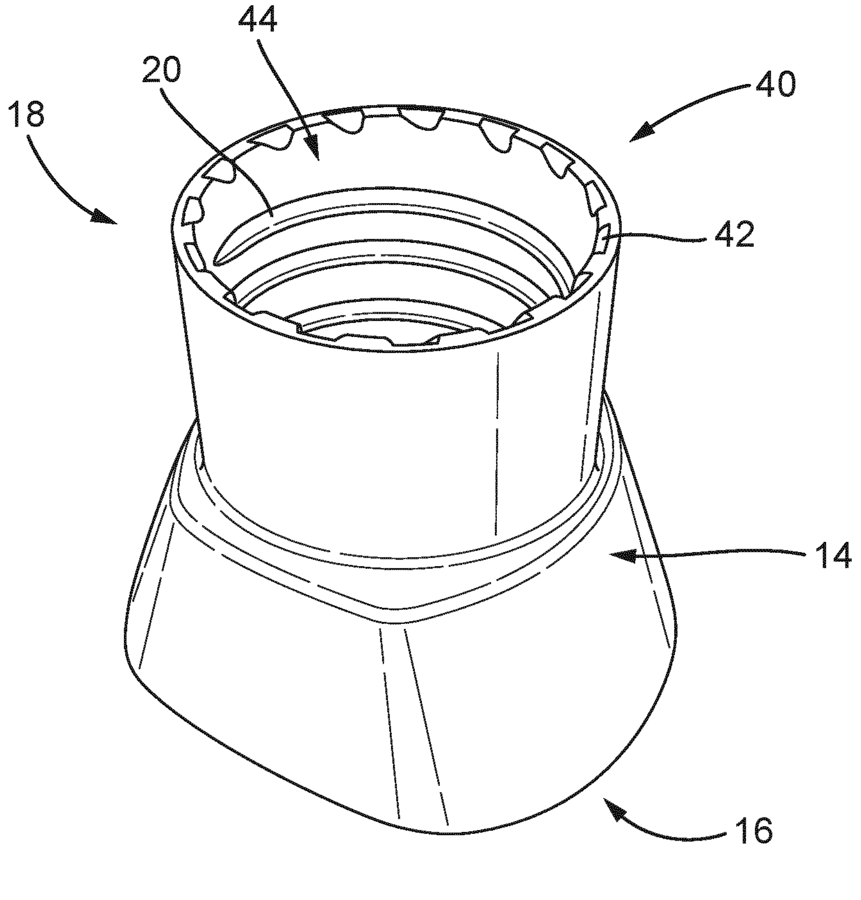
FIG. 4 is a perspective view from above of the standard screw thread side of the adapter of the invention for the embodiment where only one side of the adapter is snap on/rotate off or where both adapter sides include standard screw threads.
Figure 5:
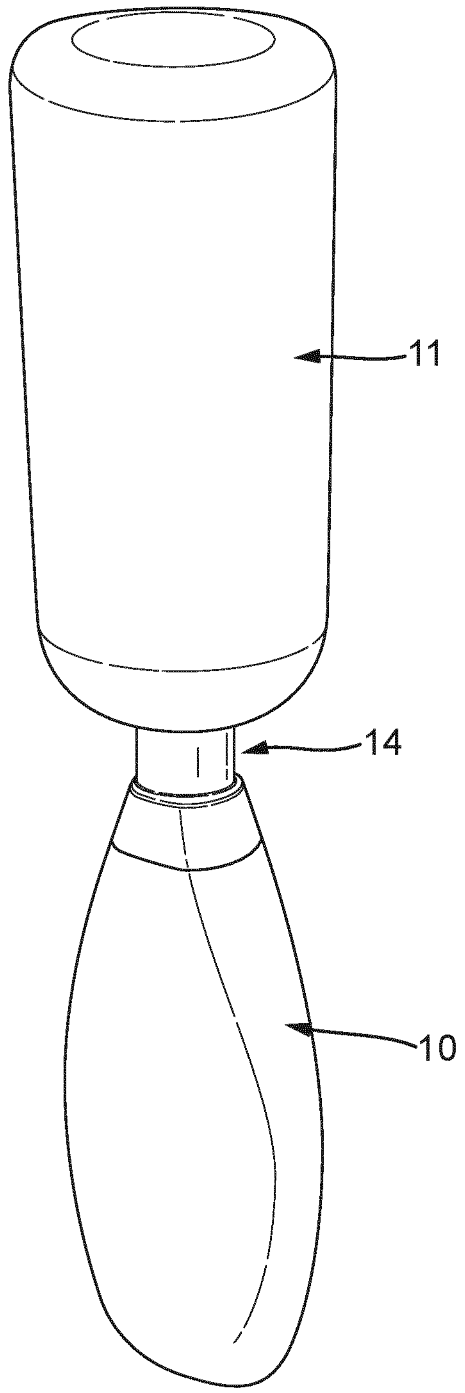
FIG. 5 is a perspective view of a dispensing bottle coupled to a refill bottle using the adapter of the invention.

On opposite side 18, an opposed second adapter opening 40 defined by a wall 42 forms the periphery of a second adapter chamber 44. (FIG. 4).

Fluid is free to pass from first adapter opening through the first adapter chamber 31 to the second adapter chamber 44 and out through the second adapter opening. Optionally one or more passageways 50 (FIG. 3) are disposed between the first and second adapter chambers, which likewise permits flow of fluid between the first and second adapter chambers.

As best seen in FIG. 3, the cylindrical snap on pipe 32 has, preferably on its interior wall, one or more first fastener protuberance(s) 54 for fastening the first adapter opening to a first container, and when only one side of the adapter is snap on/rotate off, the second adapter wall 42 (FIG. 4) has one or more second fastener protuberances 20 for fastening the second adapter wall to a second container, which may be the same or different size as the first container. Second fastener protuberance(s) 20 is preferably a conventional thread whereas first fastener protuberance(s) 54 are preferably beads for snap fitting.

The cylindrical snap-on pipe 32 (FIG. 3) has a first, proximal end adjacent the passageway 50 (or adjacent the second adapter chamber when there is no passageway 50) and an opposed second end at rim 36. Cylindrical snap-on pipe 32 includes at least one retaining recess 60 interrupting rim 36 at the second end. The embodiment of FIG. 3 includes two opposed retaining recesses. The cylindrical snap-on pipe defines opposing first and second walls 64, 46 of the retaining recess. Retaining recess 60 is sized and shaped to accommodate a lug 70 on the container (FIG. 6) when the adapter is in the closed position with respect to the container, as will be explained hereinbelow.

In one embodiment, the gradients of the first and second retaining recess walls 64, 46 are such that the gradient of one of the first and second resistance recess walls is smaller at least at one point than the gradient on the other of the first and second recess sides at a point lying at the same axial height. In this embodiment preferably the steeper gradient of one of the walls prevents movement of the lug in the direction of that wall thereby preventing the closure from opening in that direction. See, especially, FIG. 7 where steep wall 46 together with the steep right side wall of lug 70 will prevent rotation in the closing (clockwise) direction.

Figure 9:
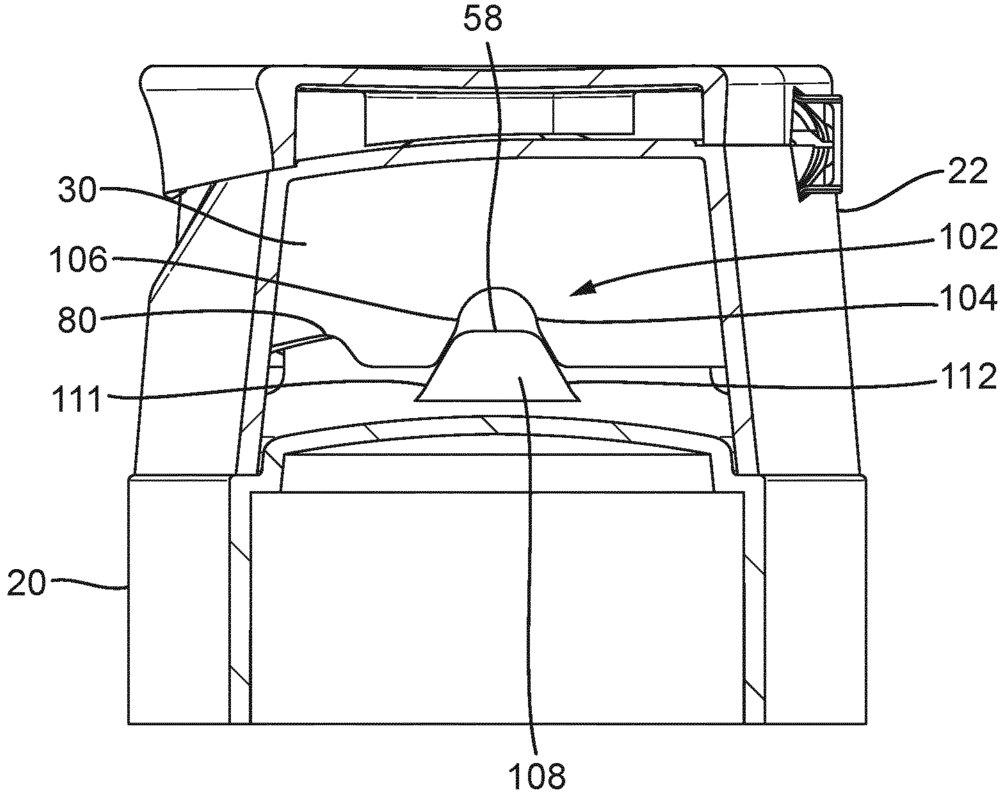
FIG. 9 is a front elevational view similar to FIG. 7 of the dispensing bottle with the adapter in the closed position, with portions broken away, but of an alternative embodiment wherein the resistance recess walls are symmetrical.

Alternatively, the gradients on the first and second retaining recess walls are the same or essentially the same at each point lying at the same axial height, in which case the recess functions mainly to ensure that the adapter is correctly oriented on the bottle after it has been snapped onto it. FIG. 9 represents this embodiment. There, it can be seen that for resistance recess 102 the gradients of walls 106 and 104 are the same at each axial height. In such case, other structure may be added to ensure that the adapter rotates only in one direction, if that is desired. An example would be a tooth on the adapter which can engage a ratchet on the bottle neck or shoulder to prevent rotation in an undesired direction.

Figure 7:
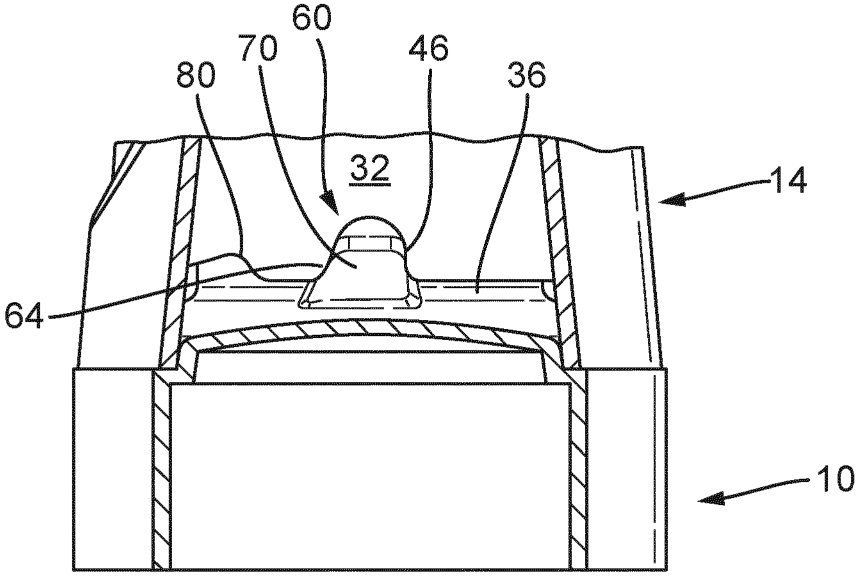
FIG. 7 is a front elevational view of the dispensing bottle with the adapter in the closed position, with portions broken away.
Figure 8:
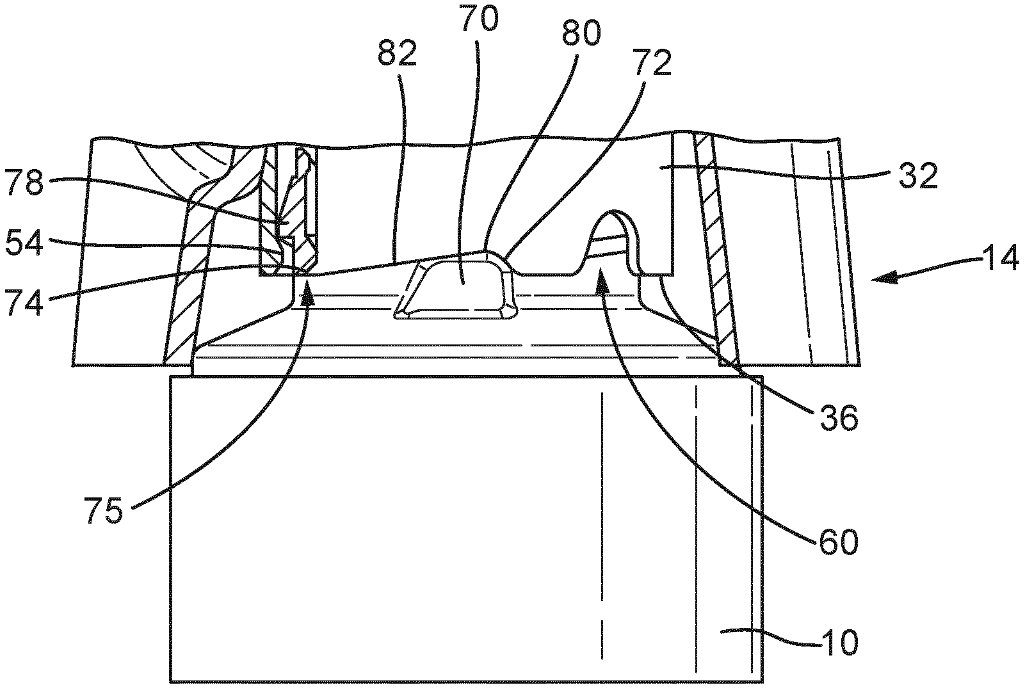
FIG. 8 is a front elevational view of the dispensing, primary bottle with the adapter rotated toward the open position and with portions broken away.

The second, distal end of the cylindrical snap-on pipe is also shaped to include one or more guidance recesses 80 which also interrupt rim 36. The embodiment of FIG. 3 includes two opposed guidance recesses, although these are best seen in FIGS. 7, 8 and 9. The guidance recess(es) includes a first guidance recess wall 72 consistent with lowering the cylindrical snap-on pipe thread relative to a container when the container is oriented so that the adapter is on top of the container. Then, still assuming that the container is oriented so that the adapter is on top of the container, adjacent to the first guidance recess wall is a second guidance recess wall 82, which wall includes a downward gradient.

The guidance recess upwardly extending wall 72 has a gradient within the range of 90 and 135 degrees to a horizontal line drawn through section 36 of the bottom rim and then a downwardly extending wall 82 at a less severe gradient of within the range of 0 to 10 degrees, especially 4 to 10 degrees, relative to a horizontal line drawn through the intersection 75 of wall 74 (FIG. 8) and pipe bottom 36. The top wall 58 of lugs 70 and 108 preferably do not touch the first and second guidance walls during rotation. Rather, the guidance recess permits free rotation of snap-on pipe 30 consistent with the pitch of the bottle neck and snap-on pipe threads during which forcing element 50 or 108 is accommodated within the space of the guidance recess. The pitch of the snap on pipe and bottle neck threads is similar to the gradient of wall 74, namely 0 to 10 degrees, especially 4 to 10 degrees.

The bottom rim of the snap-on pipe extending between the resistance recess and the guidance recess is preferably at least 2 mm and is up to 5 mm, especially from 2 to 4 mm, in length whereby to maximize durability of the closure, including promoting a good, comfortably tight, fit of the adapter on the bottle. The distance between resistance recess and the guidance recess is measured along bottom rim section 36 from the point at which wall 64 or 106 merges with snap-on pipe bottom end or rim 36 to the point at which guidance recess wall 80 begins to ascend at the beginning of wall 72.

Referring to the asymmetrical resistance wall embodiment shown especially in FIGS. 7 and 8, the adapter is configured such that when it is atop the container in a closed position, lug 70 will be wholly or partly accommodated within recess 60, as seen in FIG. 7. When the adapter is rotated in an adapter-opening direction of rotation (usually counterclockwise) lug 70 will exert force against recess wall 64 forcing the snap on pipe slightly upward and then contacting rim 36. Rotation of the closure in the opening direction results in an axial upwardly movement resulting from the angles of the bottle neck and snap-on pipe threads. Then, the first guidance recess wall 72 in contact with lug 70 permits the cylindrical snap-on pipe axially to be lowered toward the container, and the second guidance recess wall 82 is consistent with the cylindrical snap-on pipe being raised relative to the container so that the protuberance 54 on the snap on pipe maintains its axial position below protuberance or thread 73 on bottle neck 74 until the adapter is rotated to a position near location 75 in FIG. 8 wherein, due to an interruption in one or more of the bottle neck and snap on pipe protuberances, there is no container protuberance 78 above a snap on cylinder protuberance 54 to retain the cylinder protuberance on the container, and the adapter is released from the container.

The operation of the embodiment with the symmetric resistance recess walls shown in FIG. 9 is similar to that just described for FIGS. 7 and 8. Rotation of the closure in the opening direction results in an axial upwardly movement resulting from the angles of the bottle neck and snap-on pipe threads. However whereas steep wall 46 functions to prevent rotation in the closing direction once lug 70 reaches the wall in FIGS. 7 and 8, the FIG. 9 embodiment does not include a steep wall and walls 106, 104 are symmetrical. However, the angle of the protuberances may impede further rotation in the closing direction once lug 108 is in the position shown in FIG. 9. Also, as mentioned above, if desired other mechanisms may be provided such as a tooth on the adapter to engage a ratchet on the bottle and in that manner prevent further movement.

For the embodiment where the resistance recess walls are asymmetric, lug 70 may include leading (130) and trailing (132) sides having different gradients FIG. 6. Trailing wall gradient 132 is gentler, facilitating its pushing slightly upward at wall 64 whereas leading wall gradient 130 is steeper, consistent with its role together with wall 46 in stopping further rotation in the closing direction. For the embodiment where the resistance recess walls are symmetric, walls 112 and 111 can likewise be symmetric (FIG. 9).

The adapter of the invention facilitates transfer of fluids from a refill to a dispensing container and is easy to use. It can be snapped on to a container (refill and/or dispensing), which is often a more economical way of manufacture while permitting easy removal by the consumer by rotation, i.e., twisting off.

While the threads, snap on beads and other protuberances are generally illustrated herein as being internal to the snap-on pipe and external to the bottle neck, if desired this can be reversed so that the protuberance(s) will be external to the snap-on pipe and internal to the bottle neck.

When it is said herein that the gradient of each of the resistance recess walls at each axial height is essentially the same it is meant that at each axial height the angle of the wall with respect to the snap on pipe rim is within 10% of the angle at the same axial height of the opposite resistance recess wall. Preferably the angle of the wall is within 5% of the angle of the opposite recess wall, most especially within 1% more preferably within 0.5% and still preferably the angles are the same at each axial height.

The exact height and shape of the resistance recess(es) may be influenced by the material of which the snap on pipe is made and so may be adjusted after plastic components are tested.

The adapter may be made of any durable material such as polypropylene, high density polyethylene or even metal.

When it is referred to the adapter being rotated toward the open position, this means that the adapter is being rotated toward a position wherein it is released from the container. When it is referred to that the adapter is rotated toward a closed position, this means that the adapter is rotated toward a position where it is fully secured to the container with the lug received in the resistance recess.

It should be understood, of course, that the specific forms of the invention herein illustrated and described are intended to be representative only as certain changes may be made therein without departing from the clear teachings of the disclosure. Accordingly, reference should be made to the following appended claims in determining the full scope of the invention.

The invention claimed is:

1. An adapter (14) comprising first and second adapter openings having first and second fastener protuberances, liquid being free to travel between the first and second adapter openings, travel between the first and second adapter openings optionally being through a passageway (50) therebetween, the second adapter opening (40) being opposed to the first adapter opening and defined by a wall (42) forming a second adapter chamber (44) having the second adapter opening, the second adapter wall having the second fastener protuberance (20) for fastening the second adapter wall (42) to a second container, which may be the same or different size as a first container, characterized in a) a cylindrical snap-on pipe (32) opening defining a first adapter chamber and the first adapter opening,
  the cylindrical snap-on pipe (32) having the first fastener protuberance (54) for fastening the first adapter opening to the first container (10), and b) the cylindrical snap-on pipe (32) having a first proximal end and an opposed, distal second end;

c) the cylindrical snap-on pipe (32) including at least one retaining recess (60) at the second end;

d) the cylindrical snap-on pipe defining opposing first and second walls (64, 46) of the retaining recess (60);

e) the second end of the cylindrical snap-on pipe (32) being shaped to include a guidance recess (80) with a first guidance recess wall (72) consistent with lowering the cylindrical snap-on pipe fastener protuberance relative to a container when the container is oriented so that the adapter is on top of the container and the adapter is rotated in the opening direction, and the guidance recess includes a second guidance recess wall, which wall includes a downward gradient when the container is oriented so that the adapter is on top of the container, the adapter being configured such that when the adapter is atop the container in a closed position, a lug (70) on a container can be wholly or partly accommodated within the retaining recess (60), and when the adapter is rotated in an adapter-opening direction of rotation, lug (70) can exert force against recess wall (64) forcing the snap-on pipe slightly upward and then contacting rim (36) wherein rotation of the adapter in the opening direction can result in an axial upwardly movement resulting from the angles of a bottle neck and snap-on pipe fastener protuberance and then, the first guidance recess wall (72) permits the cylindrical snap-on pipe axially to be lowered toward the container, and the second guidance recess wall (82) is consistent with the cylindrical snap-on pipe being raised relative to the container so that the fastener protuberance (54) on the snap-on pipe can maintain its axial position below a fastener protuberance (73) on a bottle neck (74) until the adapter is rotated to a position wherein, due to an interruption in one or more of the bottle neck and snap-on pipe protuberances, there is no container fastener protuberance (78) above a snap-on cylinder fastener protuberance (54) to retain the cylinder fastener protuberance on the container, and the adapter can be released from the container.

2. The adapter according to claim 1 wherein one or both of the first (54) and second (20) fastener protuberances are threads for mating with threads on a container neck.

3. The adapter according to claim 1, wherein the snap-on pipe fastener protuberance is on an inner wall thereof.

4. The adapter according to claim 1, wherein the snap-on pipe fastener protuberance is at least one snap bead.

5. The adapter according to claim 1, wherein the adapter is configured to receive a lug (70) on a container (10) within the guidance recess when the container is being rotated to an open position.

6. The adapter according to claim 1, wherein the first and second retaining recess walls have gradients wherein the gradient of one of the first and second retaining recess walls (64, 46) is smaller at least at one point than the gradient on the other of the first and second recess sides at a point lying at the same axial height.

7. The adapter according to claim 1, wherein the first and second retaining recess walls (106, 104) have gradients which are essentially the same at each point lying at the same axial height.

8. The adapter according to claim 1, wherein the guidance recess (80) is configured to receive a lug (70) on a container (10) and upon rotation in the opening direction is shaped to accommodate lowering and then raising of the adapter to facilitate sliding of a snap-on pipe fastener protuberance (54) relative to a container neck fastener protuberance until an interruption in the container neck fastener protuberance and/or snap-on pipe fastener protuberance is reached and the adapter (14) is released from the container.

9. The adapter according to claim 1, wherein the interruption in one or both of the container and snap-on pipe protuberances is such that the adapter release from the container occurs when there is no container protuberance above the snap-on pipe protuberance whereby the adapter is released from the container.

10. The adapter according to claim 1, wherein the second adapter wall is a second snap-on pipe.

11. The adapter according to claim 10 wherein the second snap-on pipe comprises at least one retaining recess and at least one guidance recess.

12. The adapter (14) according to claim 1, in combination with a container (10) having a lug (70) and fastener protuberance wherein the adapter snap-on pipe (32) retaining recess (60) accommodates all or part of the lug therewithin when the adapter is in the closed position and wherein the lug contacts a rim (36) of the snap-on pipe (32) as the adapter is rotated in an opening position and the guidance recess (72, 82) walls permit the adapter to move downwardly and then upwardly relative to the container whereby the fastener protuberance (54) on the snap-on pipe (32) slides relative to the fastener protuberance on the container and maintain their axial positions wherein the container fastener protuberance retains the adapter on the container until the adapter is rotated to a point where one or more of the container fastener protuberance and the snap-on pipe fastener protuberance is interrupted and the adapter is released from the container.

13. The adapter according to claim 12 wherein the protuberance(s) (54) on the snap-on pipe are internal to the snap-on pipe (32) and the protuberance(s) on the bottle neck are external to the bottle neck.

14. The adapter according to claim 1, wherein the first guidance recess wall (72) has a gradient within the range of 90 and 135 degrees to a horizontal line drawn through section (36) of the bottom rim and then the second guidance recess downwardly extending wall (82) at a less severe gradient of within the range of 0 to 10 degrees, relative to a horizontal line drawn through the intersection (75) of wall (74) and pipe bottom (36).

15. The adapter according to claim 14 wherein the second guidance recess wall has a gradient within the range of 4 to 10 degrees.

* * * * *